US011891141B2

(12) United States Patent
White et al.

(10) Patent No.: US 11,891,141 B2
(45) Date of Patent: Feb. 6, 2024

(54) KNUCKLE FOR A SELF-STEERING AXLE/SUSPENSION SYSTEM (71) Applicant: Hendrickson USA, L.L.C., Schaumburg, IL (US)

(72) Inventors: Jay D. White, North Canton, OH (US); David L. Schaeffer, Louisville, OH (US); Dhawal P. Dharaiya, Twinsburg, OH (US)

(73) Assignee: Hendrickson USA, L.L.C., Schaumburg, IL (US)

( * ) Notice: Subject to any disclaimer, the term of this patent is extended or adjusted under 35 U.S.C. 154(b) by 0 days.

(21) Appl. No.: 17/529,363

(22) Filed: Nov. 18, 2021

(65) Prior Publication Data

US 2022/0185369 A1 Jun. 16, 2022

Related U.S. Application Data (60) Provisional application No. 63/126,193, filed on Dec. 16, 2020.

(51) Int. Cl.
*B62D 7/18* (2006.01)
*B60C 23/00* (2006.01)
*F16D 65/00* (2006.01)
*B60T 1/06* (2006.01)
*F16D 51/00* (2006.01)

(52) U.S. Cl.
CPC .......... *B62D 7/18* (2013.01); *B60C 23/00318* (2020.05); *F16D 65/0062* (2013.01); *B60G 2200/31* (2013.01); *B60G 2200/445* (2013.01); *B60G 2204/43* (2013.01); *B60G 2206/50* (2013.01); *B60T 1/067* (2013.01); *F16D 2051/003* (2013.01)

(58) Field of Classification Search
CPC .. B62D 7/18; B60T 1/067; B60T 1/06; B60G 2200/31; B60G 2200/445; B60G 2206/50; B60G 2206/10; B60G 2206/11; B60G 2204/43; F16D 2051/003; F16D 51/20; F16D 51/22; F16D 51/24; F16D 65/0062; B60C 23/003; B60C 23/00309; B60C 23/00318; B60C 23/00381; B60C 23/001; B60C 23/00
USPC ............................... 280/88, 93.512, 124.128
See application file for complete search history.

(56) References Cited

U.S. PATENT DOCUMENTS

| 5,624,011 A | 4/1997 | White et al. |
| 6,007,078 A | 12/1999 | Gottschalk et al. |
| 6,073,947 A | 6/2000 | Gottschalk et al. |
| 6,419,250 B1 | 7/2002 | Pollock et al. |
| 6,776,425 B2 | 8/2004 | Britton |
| 6,902,176 B2 | 6/2005 | Gottschalk |

(Continued)

FOREIGN PATENT DOCUMENTS

| CN | 201350896 Y | 11/2009 |
| CN | 107914528 A | 4/2018 |

(Continued)

*Primary Examiner* — Keith J Frisby
(74) *Attorney, Agent, or Firm* — Dureska & Moore, LLC; David P. Dureska; David J. Danko (57) ABSTRACT A knuckle for a heavy-duty vehicle self-steering axle/suspension system that includes integrally formed structure for mounting components of a drum brake system. The knuckle includes a spindle that is welded directly to the knuckle and a discrete tie rod arm bolted to the knuckle.

21 Claims, 6 Drawing Sheets (56) References Cited

U.S. PATENT DOCUMENTS

| | | | |
|---|---|---|---|
| 7,360,773 B2 | 4/2008 | Gottschalk | |
| 7,568,710 B2 | 8/2009 | Ramsey | |
| 8,246,060 B2 | 8/2012 | Gottschalk et al. | |
| 10,207,737 B2 | 2/2019 | Gottschalk et al. | |
| 10,471,988 B2 | 11/2019 | Westnedge et al. | |
| 10,759,475 B2 | 9/2020 | White et al. | |
| 2006/0207705 A1* | 9/2006 | Davison | B60C 23/00363 |
| | | | 152/415 |
| 2015/0266507 A1 | 9/2015 | Westnedge et al. | |
| 2016/0347362 A1* | 12/2016 | Bloink | B62D 7/18 |
| 2018/0066720 A1 | 3/2018 | Dilworth et al. | |
| 2018/0209496 A1 | 7/2018 | Hester et al. | |
| 2018/0273091 A1 | 9/2018 | Lam et al. | |
| 2022/0049751 A1* | 2/2022 | Shah | F16D 65/22 |

FOREIGN PATENT DOCUMENTS

| | | | | |
|---|---|---|---|---|
| DE | 19733158 A1 | 2/1998 | | |
| DE | 102006031708 A1 | 1/2008 | | |
| EP | 2472138 A2 | 7/2012 | | |
| WO | WO-2018029713 A2 * | 2/2018 | | B21K 1/74 |

* cited by examiner

KNUCKLE FOR A SELF-STEERING AXLE/SUSPENSION SYSTEM

CROSS-REFERENCE TO RELATED APPLICATION

This application claims the benefit of U.S. Provisional Patent Application Ser. No. 63/126,193, filed on Dec. 16, 2020.

BACKGROUND

Technical Field

The subject disclosure generally relates to axle/suspension systems for heavy-duty vehicles. More particularly, the subject disclosure relates to self-steering axle/suspension systems for heavy-duty vehicles. More specifically, the subject disclosure relates to a knuckle for a heavy-duty vehicle self-steering axle/suspension system that includes integrally formed structure for mounting components of a drum brake system, which eliminates complex manufacturing processes and components for preparing a spindle end of the knuckle to enable mounting a discrete brake spider and machining of multiple interfaces on the spindle end to position and attach the discrete brake spider, thereby reducing manufacturing complexity and cost. The knuckle includes a spindle that is a-forged, machine finished, and then friction welded directly to the knuckle with only the single friction weld, which eliminates the need to utilize multiple welds to attach the spindle to the knuckle, thereby reducing manufacturing cost and increasing the overall strength of the spindle. Also, by integrating structure for mounting drum brake system components into the knuckle, the distance from a king pin to a bearing shoulder of the spindle, and thus the distance from the king pin to a vertical centerline of a wheel attached to a wheel hub rotatably mounted on bearings attached to the spindle, is minimized. This reduces stress on the knuckle and the pivotal connection of the knuckle to an end piece of a steerable axle, thereby increasing the overall strength and reducing fatigue of the knuckle and pivotal connection of the knuckle to the steerable axle, and reducing the risk for potential premature failure of the knuckle and/or pivotal connection of the knuckle to the steerable axle. In addition, the knuckle includes a discrete tie rod arm bolted to the knuckle via axial and radial bolting in a manner that minimizes the overall size and weight of the knuckle, while providing a sturdy structure that resists overload conditions and reduces the overall weight of the heavy-duty vehicle, provides desired turn angle of the knuckle and mounted wheel, and provides the knuckle with a robust structure capable of being utilized on self-steering axle/suspension systems with varying components and configurations.

Background Art

Self-steering axle/suspension systems for heavy-duty vehicles are well known in the art. Heavy-duty vehicles include trucks and tractor-trailers or semi-trailers, and trailers thereof. Each heavy-duty vehicle generally includes a frame, from which at least one axle/suspension system is suspended, such as a self-steering axle/suspension system. In recent years, self-steering axle/suspension systems, particularly in the medium and heavy-duty truck and semi-trailer industry, have become quite popular. Such self-steering axle/suspension systems are typically used to distribute the load carried by the axles of the heavy-duty vehicle when the self-steering axle/suspension systems are in a lowered or operating position. When the heavy-duty vehicle has little or no load, the self-steering axle/suspension systems often employ lift systems and can be lifted so tires associated with the self-steering axle/suspension system do not contact the ground or road surface. The self-steering axle/suspension systems may also be of a non-liftable type. When the self-steering axle/suspension systems are in the lowered or operating position with the tires in contact with a ground or road surface, the self-steering feature provides a mechanism by which the tires may better follow the path of travel when the heavy-duty vehicle is turning, while still helping to carry the load of the heavy-duty vehicle. In trailing arm self-steering axle/suspension systems, it is known that if a steerable axle is installed with the proper pitch or caster angle, the drag of the mounted wheels will cause the steerable axle to steer automatically in response to steering of the vehicle.

Such self-steering axle/suspension systems are generally similar in that each typically includes a steerable axle with a central axle tube supported by a pair of transversely-spaced trailing arm beams, which are welded or otherwise rigidly attached to the central axle tube. Each trailing arm beam is pivotally connected at its front end to a respective one of a pair of transversely-spaced frame hangers, which in turn are rigidly attached to and depend from respective main members of a frame of the heavy-duty vehicle. The self-steering axle/suspension system often includes a pair of shock absorbers and a pair of air springs. Each shock absorber extends between and is mounted on a respective one of the beams and is attached to its corresponding hanger or main member of the heavy-duty vehicle frame. Each air spring extends between and is mounted on a rear end of a respective one of the beams and a corresponding main member of the heavy-duty vehicle frame. Together, the shock absorbers and air springs provide desired ride characteristics to the self-steering axle/suspension system, and thus the heavy-duty vehicle.

To allow wheels attached to the steerable axle of the self-steering axle/suspension system to turn, the steerable axle also includes a pair of end pieces, which are attached to respective outboard ends of the central axle tube by suitable means, such as welds. The self-steering axle/suspension system further includes a pair of prior art knuckles, which are pivotally connected to respective end pieces of the steerable axle via king pins disposed through vertically aligned openings formed in the knuckles and the end pieces. Each prior art knuckle includes a spindle end, which is rigidly attached to the outboard surface of the knuckle by any suitable means, such as welding or fasteners. A wheel end assembly is rotatably mounted on the spindle end in a manner well known in the art. More specifically, the wheel end assembly includes a bearing assembly with an inboard bearing and an outboard bearing that are mounted on the outboard end of the spindle end. A spindle nut assembly is threaded onto the outboard end of the spindle end and secures the inboard and outboard bearings in place. A wheel hub of the wheel end assembly is mounted on the inboard and outboard bearings for rotation relative to the spindle end, as is known. A hub cap is mounted on the outboard end of the wheel hub and closes the outboard end of the wheel hub, and thus the wheel end assembly. A plurality of threaded fasteners or studs and mating nuts are used to mount a rim or a pair of rims, depending on specific design considerations of the wheel end assembly, to the wheel hub. A tire is mounted on each rim, as is known. Together the wheel rim with mounted tire are collectively referred to as a "wheel" for purposes of this disclosure.

Each prior art knuckle includes a pivot arm or tie rod arm, which is formed with a pair of longitudinally spaced openings. A tie rod is connected to the rearwardmost one of the pair of openings via a fastener. A coil over spring is connected at a first end to the frontwardmost opening of the tie rod arm via a fastener. The second end of the coil over spring is connected to a bracket, which in turn is connected to the central axle tube of the steerable axle by any suitable means, such as welds and/or fasteners.

When the wheels mounted on the prior art knuckles turn, the knuckles pivot relative to the end pieces of the steerable axle about the king pins. When the wheels turn toward the driver side of the vehicle to make a forward left turn, the driver side knuckle pivots toward the driver side end piece of the steerable axle about the pivotal connection to the end piece via the king pin, while the passenger side knuckle pivots away from the passenger side end piece of the steerable axle about the pivotal connection to the end piece via the respective king pin. Conversely, when the wheels mounted on the prior art knuckles turn toward the passenger side of the vehicle to make a forward right turn, the driver side knuckle pivots away from the driver side end piece of the steerable axle about the pivotal connection to the end piece via the king pin, while the passenger side knuckle pivots toward the passenger side end piece of the steerable knuckle about the pivotal connection to the end piece via the respective king pin. Because the driver side and passenger side knuckles are connected to one another via the tie rod, each wheel attached to their respective spindle end are maintained in substantially parallel alignment to one another during a forward right and forward left vehicle turn, with the passenger side wheel turning at a slightly larger angle than the driver side wheel in a forward right vehicle turn and the driver side wheel turning at a slightly larger angle than the passenger side wheel in a forward left vehicle turn. In this manner, the self-steering axle/suspension system aids in maneuvering the heavy-duty vehicle during turns.

Self-steering axle/suspension systems often incorporate drum brake systems to provide braking to the heavy-duty vehicle. When utilized with heavy-duty vehicle self-steering axle/suspension systems, components of the drum brake systems are typically incorporated into or mounted on components of self-steering axle/suspension systems, such as the spindle ends of prior art knuckles. The drum brake systems generally include a pair of drum brake assemblies incorporated into respective outboard ends of the self-steering axle/suspension system. More specifically, each drum brake assembly typically includes a brake drum attached to a wheel hub of the wheel end assembly rotatably mounted on an outboard end of the spindle end of the respective prior art knuckle. The drum brake assembly also includes a pair of brake shoes housed within, and radially spaced from the interior braking surface of the brake drum. The brake shoes are pivotally connected to a discrete brake spider fixedly attached to the spindle end inboardly of the wheel end assembly. Each brake shoe is connected to a respective roller on the end of the brake shoe opposite the pivotal connection. An S-cam attached to the outboard end of a cam shaft of a cam shaft assembly attached to the knuckle engages the rollers for actuation of the brake shoes.

During operation, when the drum brake system of the heavy-duty vehicle is actuated, such as by pressurization of a brake air chamber operatively connected to the cam shaft, the cam shaft rotates, thereby rotating the S-cam. The rotation of the S-cam, in turn, overcomes one or more brake return springs connected between the brake shoes, forcing brake linings of the brake shoes radially outward such that brake linings of the brake shoes contact the interior braking surface of the brake drum, thereby creating friction to slow or stop the heavy-duty vehicle. Once the drum brake system is no longer actuated, the cam shaft, and thus the S-cam, rotates back, allowing the brake return spring(s) to re-establish a radially-spaced relationship between the brake linings of the brake shoes and interior braking surface of the brake drum.

While generally suitable for their intended purpose, such prior art knuckles for self-steering axle/suspension systems have certain disadvantages, drawbacks, and limitations. For example, such prior art knuckles typically utilize discrete brake spiders that are welded or otherwise rigidly attached to the spindle ends of the knuckles when the self-steering axle/suspension system employs a drum brake system. The use of such discrete brake spiders often includes a complex manufacturing process that first requires an axle end to be cut off and removed from a straight axle with spindles friction mounted to a central tube, such that the axle end includes a spindle and a portion of a central tube, referred to herein as a "spindle end". Multiple interfaces may be machined on the spindle end to enable positioning of the discrete brake spider. The spindle end is then welded or otherwise rigidly attached to a body of the prior art knuckle. The discrete brake spider is then positioned and welded on the spindle end between the location of the inboard bearing of the bearing assembly on which the wheel hub is rotatably mounted and the inboard end of the spindle end. This complex manufacturing process required to prepare the spindle end of the prior art knuckle for mounting and attachment of the discrete brake spider increases the overall cost and complexity to manufacture the prior art knuckle.

In addition, when the spindle end is prepared by this complex manufacturing process and attached to the prior art knuckle, four welds are typically required, the first weld being between the central tube and spindle during preparation of the spindle end and the second weld being between the inboard end of the spindle end and the body of the prior art knuckle. The third and fourth welds attach the outboard and inboard side of the brake spider to the spindle end. Because the prior art knuckle requires four welds to attach the spindle end and brake spider, the overall strength of the spindle end is reduced, which increases stress and fatigue of the spindle and can potentially result in reduced life of the spindle end, and thus the prior art knuckle.

Moreover, with such prior art knuckles, to support attachment of the brake spider, the overall length of the spindle end must be undesirably increased to provide space for weld torch access for attaching the brake spider to the spindle end. This increased length of the axle end results in the wheel hub and attached wheel being positioned further outboardly from the pivotal connection of the knuckle to the end piece of the steerable axle via the king pin, which increases stress and fatigue of the knuckle and the pivotal connection of the knuckle to the end piece, which can potentially result in reduced life or premature failure of the knuckle and/or pivotal connection of the knuckle to the end piece of the steerable axle.

Furthermore, such prior art knuckles often include tie rod arms that are welded to the body of the knuckle. Such welded connection of the tie rod arm to the body of the knuckle can potentially fail when operating in harsh or abusive environments, such as during off-road operation of the self-steering axle/suspension system, for example, on a construction site, or during an overload condition on the knuckle. Alternatively, such prior art knuckles have employed a pair of axial bolts disposed through respective aligned axial openings formed in the tie rod arm and the body of the knuckle to secure the tie rod arm to the body. Such attachment configurations typically require the knuckle to have a relatively large body and/or a larger tie rod arm to support such mounting, which results in overall increased weight of the self-steering axle/suspension system, and thus the heavy-duty vehicle. Moreover, due to packaging constraints, such configurations can also undesirably limit the degree of turn angle of the knuckle, and thus the associated wheel.

Thus, there is a need in the art for a knuckle for a heavy-duty vehicle self-steering axle/suspension system that includes an integrally formed structure for mounting components of a drum brake system, which eliminates complex manufacturing processes and components for preparing a spindle end of the knuckle capable of mounting a discrete brake spider to position and attach the discrete brake spider on the spindle end, thereby reducing manufacturing complexity and cost. There is also a need in the art for a knuckle that includes a spindle that is a-forged, machine finished, and then friction welded directly to the knuckle with only the single friction weld, which eliminates the need to utilize multiple welds to attach the spindle to the knuckle, and multiple welds to attach a discrete brake spider to the spindle of the knuckle, thereby reducing manufacturing cost and increasing the overall strength of the spindle. There is also a need in the art for a knuckle that minimizes the distance from a king pin to a bearing shoulder of the spindle, and thus the distance from the king pin to a vertical centerline of a wheel attached to a wheel hub rotatably mounted on bearings attached to the spindle, which reduces stress on the knuckle and the pivotal connection of the knuckle to an end piece of a steerable axle, thereby increasing the overall strength and reducing fatigue of the knuckle and pivotal connection of the knuckle to the steerable axle, and reducing the risk for potential premature failure of the knuckle and/or pivotal connection of the knuckle to the steerable axle. In addition, there is also a need in the art for a knuckle that includes a discrete tie rod arm connected to the knuckle in a manner that minimizes the overall size and weight of the knuckle, while providing a sturdy structure that resists overload conditions, which reduces the overall weight of the heavy-duty vehicle, provides desired turn angle of the knuckle and mounted wheel, and provides the knuckle with a robust structure capable of being utilized on self-steering axle/suspension systems with varying components and configurations.

The knuckle for a heavy-duty vehicle self-steering axle/suspension system of the subject disclosure satisfies these needs and overcomes the above described disadvantages, drawbacks, and limitations, and will now be described.

BRIEF DESCRIPTION OF THE SUBJECT DISCLOSURE

An objective of the subject disclosure is to provide a knuckle for a heavy-duty vehicle self-steering axle/suspension system that eliminates complex manufacturing processes and components for preparing a spindle end of the knuckle to enable mounting of a discrete brake spider and machining of multiple interfaces on the spindle end to position and attach the discrete brake spider, thereby reducing manufacturing complexity and cost.

Another objective of the subject disclosure is to provide a knuckle for a heavy-duty vehicle self-steering axle/suspension system with a configuration/structure that eliminates the need to utilize multiple welds to attach the spindle to the knuckle, thereby reducing manufacturing cost and increasing the overall strength of the spindle.

Yet another objective of the subject disclosure is to provide a knuckle for a heavy-duty vehicle self-steering axle/suspension system that minimizes the distance from a king pin to a bearing shoulder of the spindle, and thus the distance from the king pin to a vertical centerline of a wheel attached to a wheel hub rotatably mounted on bearings attached to the spindle, thereby reducing stress on the knuckle and pivotal connection of the knuckle to a steerable axle of the self-steering axle/suspension system and increasing the overall strength and reducing fatigue of the knuckle and pivotal connection of the knuckle to the steerable axle, and reducing the risk for potential premature failure of the knuckle and/or pivotal connection of the knuckle to the steerable axle.

Another objective of the subject disclosure is to provide a knuckle for a heavy-duty vehicle self-steering axle/suspension system that includes a discrete tie rod arm connected to the knuckle in a manner that minimizes the overall size and weight of the knuckle, while providing a sturdy structure that resists overload conditions and reduces the overall weight of the heavy-duty vehicle, provides desired turn angle of the knuckle and mounted wheel, and provides the knuckle with a robust structure capable of being utilized on self-steering axle/suspension systems with varying components and configurations.

These objectives and other are achieved by the knuckle for a heavy-duty vehicle self-steering axle/suspension system of the subject disclosure, which includes: a body, the body receiving a king pin of the self-steering axle/suspension system for pivotal connection of the knuckle to an axle of the self-steering axle/suspension system; a spindle extending from an outboard surface of the body; and drum brake system component mounting structure, the drum brake system component mounting structure being integrally formed with the body and mounting one or more components of the drum brake system.

BRIEF DESCRIPTION OF THE SEVERAL VIEWS OF THE DRAWINGS

An exemplary embodiment of the subject disclosure, illustrative of the best mode in which Applicant has contemplated applying the principles, is set forth in the following description and is shown in the drawings.

Similar numerals and characters refer to similar components throughout the drawings.

DETAILED DESCRIPTION OF THE SUBJECT DISCLOSURE

Figure 1:
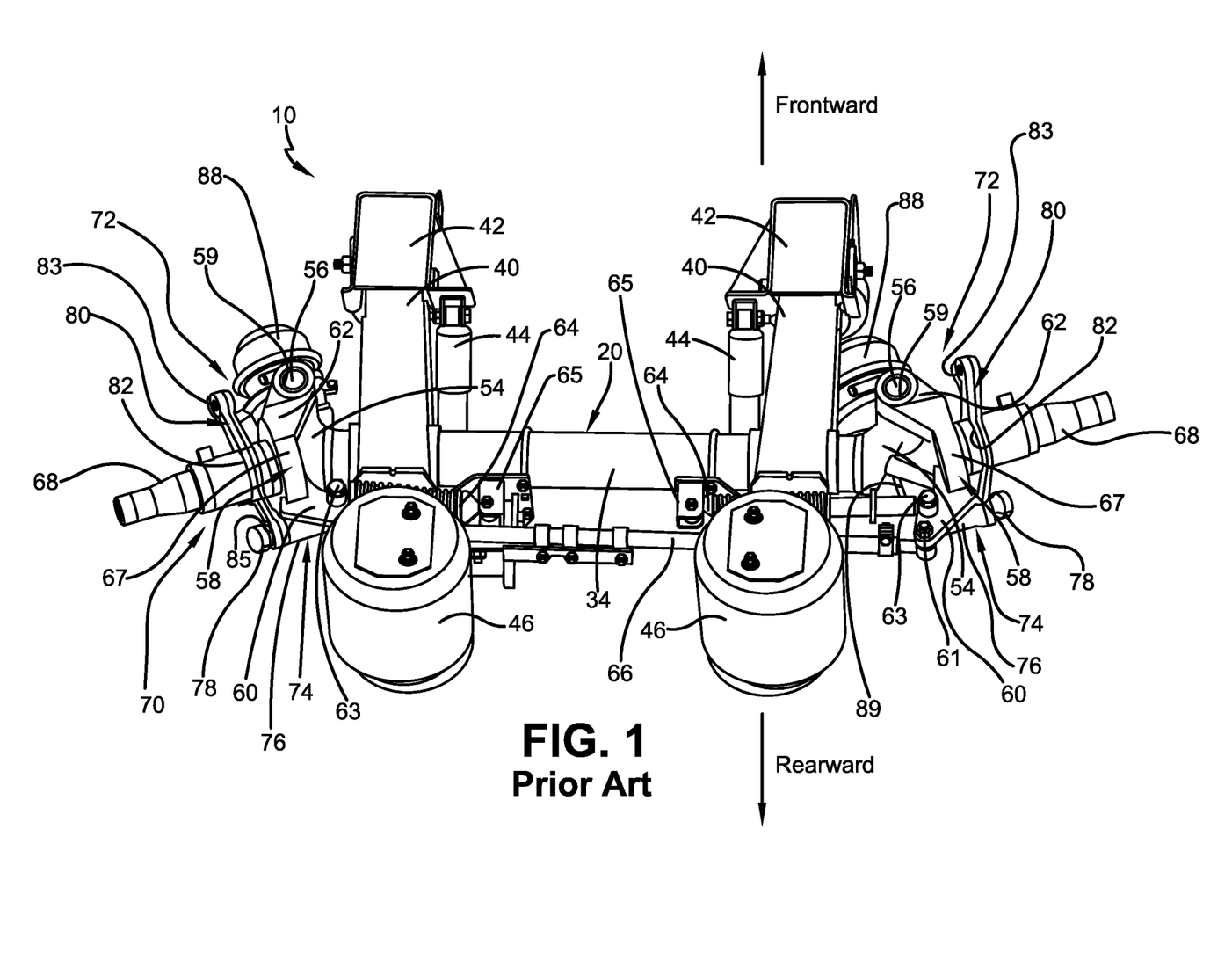
FIG. 1 is a perspective view of a trailing arm heavy-duty vehicle self-steering axle/suspension system that employs a pair of prior art knuckles, showing a discrete brake spider of a drum brake assembly of a drum brake system attached to a spindle end of each knuckle.

In order to better understand the knuckle for a heavy-duty vehicle self-steering axle/suspension system of the subject disclosure and the environment in which it operates, a heavy-duty vehicle self-steering axle/suspension system that employs a pair of prior art knuckles is shown in FIG. 1, and is indicated generally at reference numeral 10.

Self-steering axle/suspension system 10 includes a steerable axle 20. Steerable axle 20 includes a central axle tube 34 supported by a pair of transversely-spaced trailing arm beams 40, to which the central axle tube is welded or otherwise rigidly attached. Each trailing arm beam 40 is pivotally attached at its front end to a respective one of a pair of transversely-spaced frame hangers 42 that are rigidly attached to and depend from respective main members (not shown) of a frame (not shown) of the heavy-duty vehicle. Self-steering axle/suspension system 10 includes a pair of air springs 46. Each air spring 46 extends between and is mounted on a rear end of a respective beam 40 and in turn is attached to a respective main member of the heavy-duty vehicle frame. Self-steering axle/suspension system 10 also includes a pair of shock absorbers 44. Each shock absorber 44 extends between and is mounted on a respective one of beams 40 and a corresponding hanger 42. Together, air springs 46 and shock absorbers 44 help provide desirable ride characteristics to self-steering axle/suspension system 10, and thus the heavy-duty vehicle, during operation, as is known.

Steerable axle 20 also includes a pair of end pieces 54, which are attached to respective outboard ends of central axle tube 34 of the steerable axle by any suitable means, such as welds. Each end piece 54 enables pivotal connection of a prior art knuckle 58, as will be described below. Inasmuch as prior art knuckles 58 are similar, for purposes of conciseness and clarity, only a single prior art knuckle and its pivotal connection to a respective end piece 54 of steerable axle 20 will be described.

Prior art knuckle 58 includes a body 67 and a pair of arms 62 (only one shown) extending frontward/inboardly therefrom. Arms 62 of knuckle 58 are vertically aligned with one another such that there is a gap (not shown) between the arms. Arms 62 are formed with respective vertical openings 59 (only one shown) that are vertically aligned with each other. End piece 54 of steerable axle 20 is also formed with a vertical opening (not shown) and is disposed in the gap between arms 62 of knuckle 58 such that the opening is in vertical alignment with vertical openings 59 of the arms. A king pin 56 is disposed through the aligned vertical openings 59 of arms 62 of knuckle 58 and the vertical opening of end piece 54 of steerable axle 20 to pivotally connect the knuckle to the end piece.

Prior art knuckle 58 includes a spindle end 68, which is rigidly attached to the outboard surface of the knuckle by suitable means, such as welding or fasteners. A wheel end assembly (not shown) is rotatably mounted on spindle end 68 in a manner well known in the art. More specifically, the wheel end assembly includes a bearing assembly (not shown) with an inboard bearing (not shown) and an outboard bearing (not shown) that are mounted on the outboard end of spindle end 68. A spindle nut assembly (not shown) is threaded onto the outboard end of spindle end 68 and secures the inboard and outboard bearings in place. A wheel hub (not shown) of the wheel end assembly (not shown) is mounted on the inboard and outboard bearings for rotation relative to spindle end 68, as is known. A hub cap (not shown) is mounted on the outboard end of the wheel hub and closes the outboard end of the wheel hub, and thus the wheel end assembly. A plurality of threaded fasteners or studs (not shown) and mating nuts (not shown) are used to mount a single rim (not shown) or a pair of rims (not shown), depending on specific design considerations of the wheel end assembly, to the wheel hub. A tire (not shown) is mounted on each rim, as is known.

Prior art knuckle 58 includes a tie rod arm or pivot arm 60, which is rigidly attached to body 67 of the knuckle by suitable means, such as welds. Tie rod arm 60 is formed with a pair of longitudinally spaced openings (not shown). A tie rod 66 is pivotally connected to the rearwardmost one of the pair of openings via a fastener 61 (only one shown). A coil over spring 64 is connected to the frontwardmost opening of tie rod arm 60 via a fastener 63. Coil over spring 64 in turn is connected to a bracket 65, which is attached to central axle tube 34 of steerable axle 20 by any suitable means, such as welds and/or fasteners. Coil over spring 64 aids in returning the wheels attached to self-steering axle/suspension system 10 to a straight direction after a vehicle turn, as is known.

When the wheels mounted on prior art knuckle 58 turn, the knuckle pivots relative to end piece 54 of steerable axle 20 about king pin 56. When the heavy-duty vehicle makes a forward left turn, the wheels turn toward the driver side of the vehicle and the driver side knuckle 58 pivots toward end piece 54 about the pivotal connection via king pin 56, while the passenger side knuckle pivots away from its respective end piece about the pivotal connection via the respective king pin. Conversely, when the heavy-duty vehicle makes a forward right-hand turn, the wheels turn toward the passenger side of the vehicle and the passenger side knuckle 58 pivots toward its respective end piece 54 about the pivotal connection via king pin 56, while the driver side knuckle pivots away from its respective end piece about the pivotal connection via the respective king pin. Because the driver side and passenger side knuckles 58 are connected to one another via tie rod 66, the respective wheels mounted on the knuckles are maintained in substantially parallel alignment with one another during a forward left turn or a forward right turn of the heavy-duty vehicle, with the driver side wheel turning at a slightly larger angle than the passenger side wheel in a forward left turn and the passenger side wheel turning at a slightly larger angle than the driver side wheel in a forward right turn.

Self-steering axle/suspension system 10 incorporates components of a drum brake system 70 to provide braking to the heavy-duty vehicle. Drum brake system 70 includes a pair of drum brake assemblies 72 that are incorporated into respective outboard ends of self-steering axle/suspension system 10, as will be described in detail below. Inasmuch as drum brake assemblies 72 are similar, for purposes of conciseness and clarity, only a single drum brake assembly will be described.

Drum brake assembly 72 includes a discrete brake spider 80, which is disposed over spindle end 68 of prior art knuckle 58 via a central bore 82 formed in the brake spider and is immovably attached to the spindle end by suitable means, such as welds. Drum brake assembly 72 includes a cam shaft assembly 74 mounted to prior art knuckle 58 and brake spider 80. More specifically, cam shaft assembly 74 includes a cam tube 76. The outboard end of cam tube 76 is disposed through a cam tube bore 85 formed in brake spider 80 and is attached thereto via any suitable means, such as welds. The inboard end of cam tube 76 extends inboardly from cam tube bore 85 of brake spider 80 and may be attached to body 67 of knuckle 58 or brake spider 80 by suitable means, such as welds.

Cam shaft assembly 74 further includes a cam shaft (not shown), which is disposed through and rotatably mounted within cam tube 76. More specifically, the cam shaft passes through outboard and inboard bushings (not shown) that are friction-fit within the outboard and inboard ends of cam tube 76, respectively. The cam shaft extends outboardly and inboardly of the outboard and inboard ends of cam tube 76, respectively. The outboard and inboard bushings within cam tube 76 enable rotation of the cam shaft within the cam tube. The cam shaft includes a splined inboard end (not shown) that extends inboardly of the inboard end of cam tube 76. The splined inboard end of the cam shaft meshingly engages a corresponding splined interior surface (not shown) of a slack adjuster (not shown), as is known in the art. Cam shaft assembly 74 further includes an S-cam 78 that is attached to the outboard end of the cam shaft, such that the S-cam is exposed and is located outboard of and adjacent to the outboard end of cam tube 76.

Drum brake assembly 72 further includes a brake air chamber 88 that is in fluid communication with an air source located on the heavy-duty vehicle via a pneumatic line (not shown). Brake air chamber 88 is utilized to actuate other components of the drum brake assembly to provide braking to the heavy-duty vehicle, as is known. Brake air chamber 88 is mounted to a bracket (not shown) that may be rigidly attached to the inboard end of cam tube 76 or knuckle 58 in a known manner. A push rod 89 (only one shown) slidably and operatively connected to brake air chamber 88 extends rearwardly from the brake air chamber, and in turn is pivotally connected to the slack adjuster.

During braking of the heavy-duty vehicle, air is introduced into brake air chamber 88 from the air source located on the vehicle via the pneumatic line connected between the air source and the brake air chamber. As the air pressure within brake air chamber 88 increases, push rod 89 is forced rearwardly. Because push rod 89 is pivotally connected to the slack adjuster, and the cam shaft is connected to the slack adjuster via the splined connection and is rotatably mounted within cam tube 76, rearward movement of the push rod causes rotation of the cam shaft within the cam tube. This in turn causes rotation of S-cam 78 attached to the outboard end of the cam shaft, which forces brake linings of a pair of brake shoes (not shown) pivotally connected to a pair of anchor pins (not shown) disposed within brake shoe mounting openings 83 formed in brake spider 80 against an interior braking surface (not shown) of a brake drum (not shown) mounted to the wheel hub to slow or stop the heavy-duty vehicle.

While generally suitable for its intended purpose, prior art knuckle 58 has certain disadvantages, drawbacks, and limitations. As indicated above, knuckle 58 utilizes brake spider 80, a discrete component, to mount other components of drum brake assembly 72, which is disposed over spindle end 68 of the knuckle via central bore 82 formed in the brake spider and is immovably attached to the spindle end by suitable means, such as welds. In order to prepare spindle end 68 to accommodate mounting and attachment of brake spider 80, a relatively complex manufacturing process is typically employed. More specifically, in order to prepare spindle end 68 to accommodate mounting and attachment of brake spider 80, a pair of spindles (not shown) are first attached to a central tube (not shown) via a friction welding process to form a straight axle (not shown). A portion of the straight axle that includes a portion of the central tube and friction welded spindle is then cut off of the straight axle to provide spindle end 68. Spindle end 68 is then welded or otherwise rigidly attached to body 67 of prior art knuckle 58. Brake spider 80 is then mounted and welded on spindle end 68, typically between the location of the spindle end where the inboard wheel hub bearing is mounted and the outboard side of body 67 of prior art knuckle 58.

This relatively complex manufacturing process for preparing spindle end 68 for attachment to body 67 of knuckle 58 and subsequent mounting and attachment of brake spider 80 increases the overall cost to manufacture knuckle 58, and thus self-steering axle/suspension system 10. In addition, when spindle end 68 is attached to knuckle 58 in this manner, four welds are required, the first weld being between the central tube and spindle during preparation of spindle end 68, and the second weld being between the inboard end of the spindle end and body 67 of knuckle 58. The third and fourth welds attach brake spider 80 to spindle end 68, the third weld being located on the outboard side of the brake spider and the fourth weld being located on the inboard side of the brake spider. Because four welds are required to attached spindle end 68 to body 67 of knuckle 58 and brake spider 80 to the spindle end, the overall strength of the spindle end and the brake spider attachment thereto can potentially be reduced, which increases stress and fatigue of the spindle end and brake spider attachment, and potentially can result in reduced life of the spindle end, and thus knuckle 58. In addition, the fourth weld, being located on the inboard side of brake spider 80, is difficult to execute because of the relatively restrictive space between the inboard side of the brake spider and the outboard surface of body 67 of knuckle 58, as well from interference by cam tube 76 of cam shaft assembly 74. Moreover, the restrictive space and interference by cam tube 76 of cam shaft assembly 74 may require that the fourth weld be interrupted in the area of the cam tube, and thus undesirably prevent the weld from being fully circumferential about spindle end 68 and the inboard surface of brake spider 80 adjacent central bore 82 of the brake spider.

Furthermore, to support mounting and attachment of brake spider 80 to spindle end 68, and thus prior art knuckle 58, the overall length of the spindle end must be undesirably increased to provide space for weld torch access for attaching the brake spider to the spindle end. The increased length of spindle end 68 results in the wheel hub and attached wheel to be positioned and rotatably mounted on the spindle end further outboardly from the pivotal connection of knuckle 58 to end piece 54 of steerable axle 20 via king pin 56, which increases stress and fatigue of the knuckle and pivotal attachment of the knuckle to the end piece. This can potentially result in premature failure of knuckle 58 and/or pivotal connection of the knuckle to end piece 54 of steerable axle 20 unless additional support structure is incorporated into the knuckle to compensate for the higher loads at the knuckle and pivotal connection of the knuckle to the steerable axle, which would undesirably increase the cost of the knuckle and overall weight of the heavy-duty vehicle.

In addition, tie rod arm 60 of prior art knuckle 58 is welded to body 67 of the knuckle. The welded connection of tie rod arm 60 to body 67 of knuckle 58 can potentially fail when operating in abusive environments, such as during off-road operation of the heavy-duty vehicle incorporating self-steering axle/suspension system 10, for example, on a construction site, or during an overload condition on the knuckle. The knuckle for a heavy-duty vehicle self-steering axle/suspension system of the subject disclosure overcomes the above described disadvantages, drawbacks, and limitations, and will now be described.

An exemplary embodiment knuckle for a heavy-duty vehicle self-steering axle/suspension system of the subject disclosure is shown in FIGS. 2-6 and is indicated generally at 200. Exemplary embodiment knuckle 200 is utilized in conjunction with a heavy-duty vehicle self-steering axle/suspension system, such as self-steering axle/suspension system 10 described above. A pair of exemplary embodiment knuckles 200 are pivotally connected to respective ends of a steerable axle 120 (FIG. 6) of the self-steering axle/suspension system, as will be described in detail below. Inasmuch as exemplary embodiment knuckles 200 pivotally connected to respective ends of steerable axle 120 are similar, for purposes of conciseness and clarity only one knuckle and its pivotal connection to the steerable axle will be described in detail.

Figure 2:
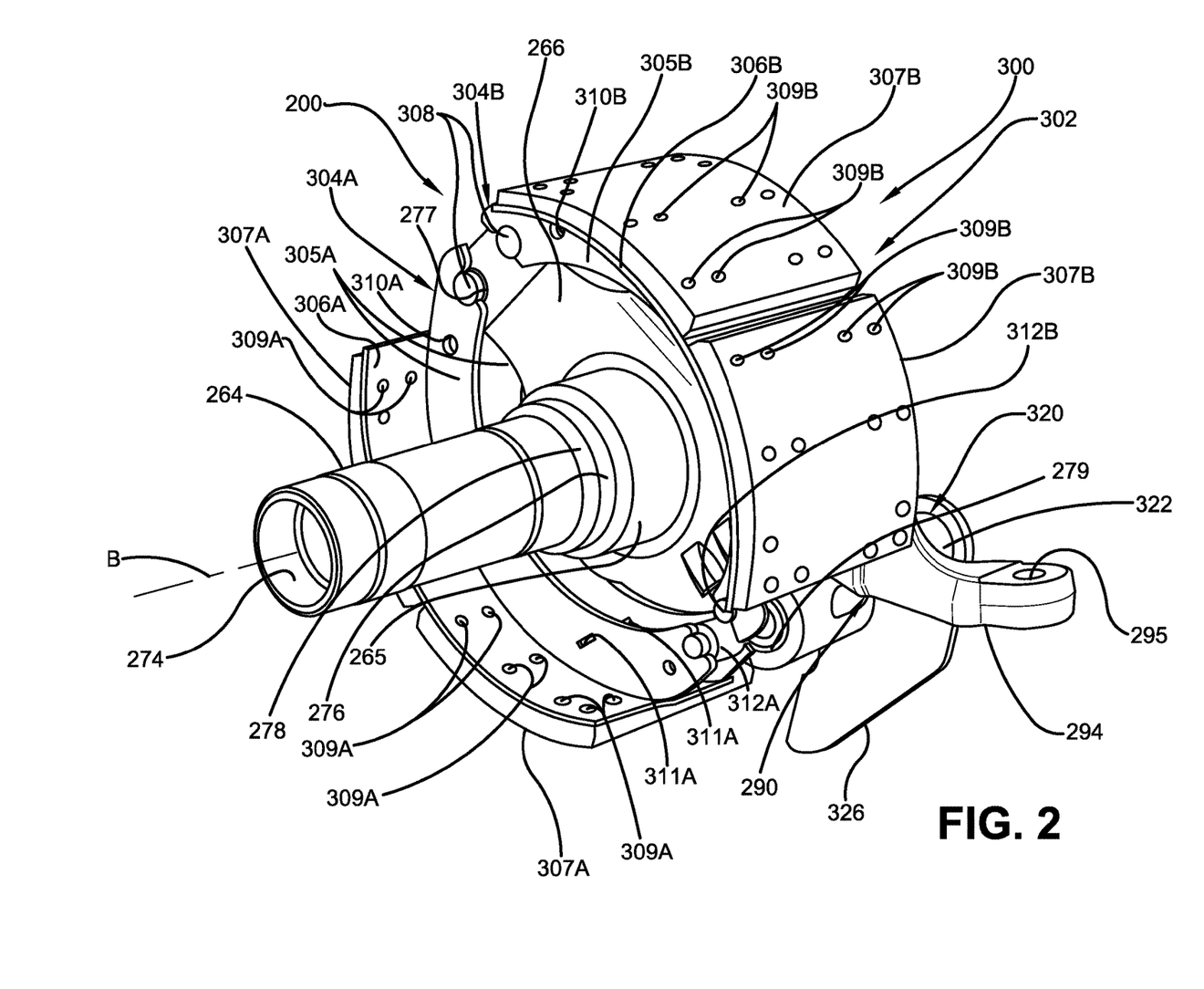
FIG. 2 is a perspective view of an exemplary embodiment knuckle for a heavy-duty vehicle self-steering axle/suspension system of the subject disclosure, viewed looking in an inboard direction, showing components of a drum brake assembly of a drum brake system mounted to structure integrated into the knuckle.
Figure 3:
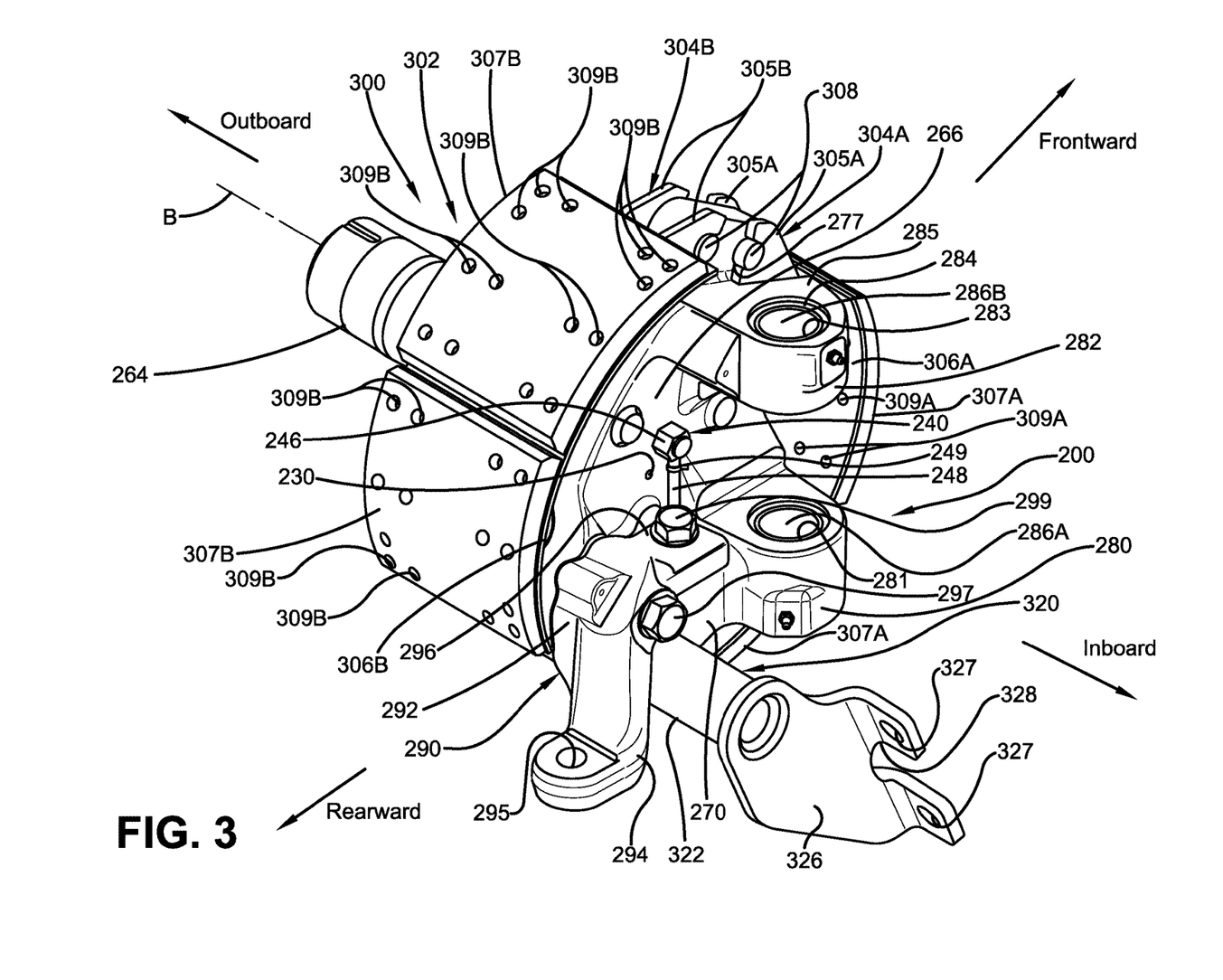
FIG. 3 is a perspective view of the exemplary embodiment knuckle with mounted drum brake assembly components shown in FIG. 2, viewed looking in an outboard direction.
Figure 4:
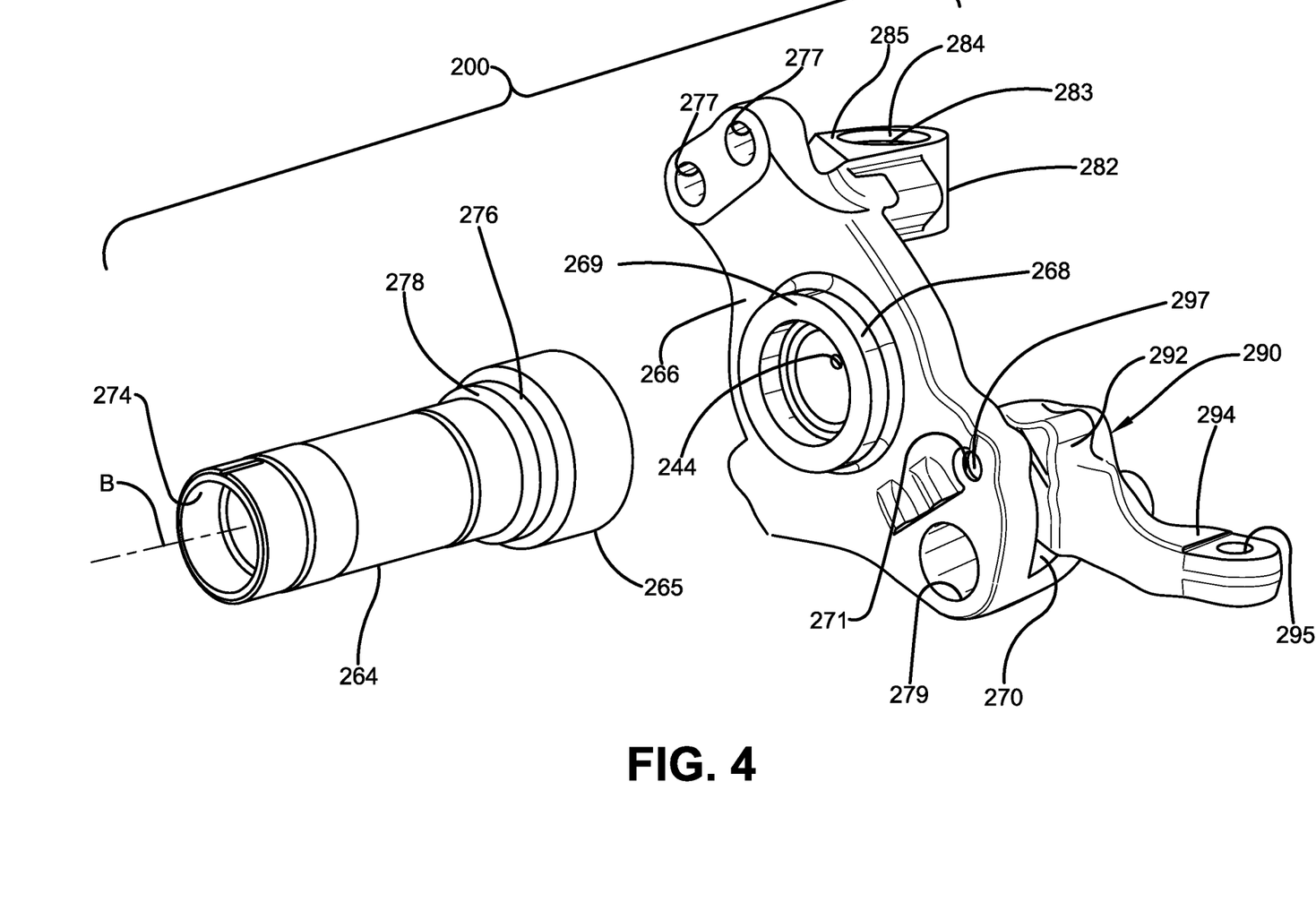
FIG. 4 is an exploded perspective view of the exemplary embodiment knuckle shown in FIG. 2, showing a spindle of the knuckle removed from the knuckle.
Figure 5:
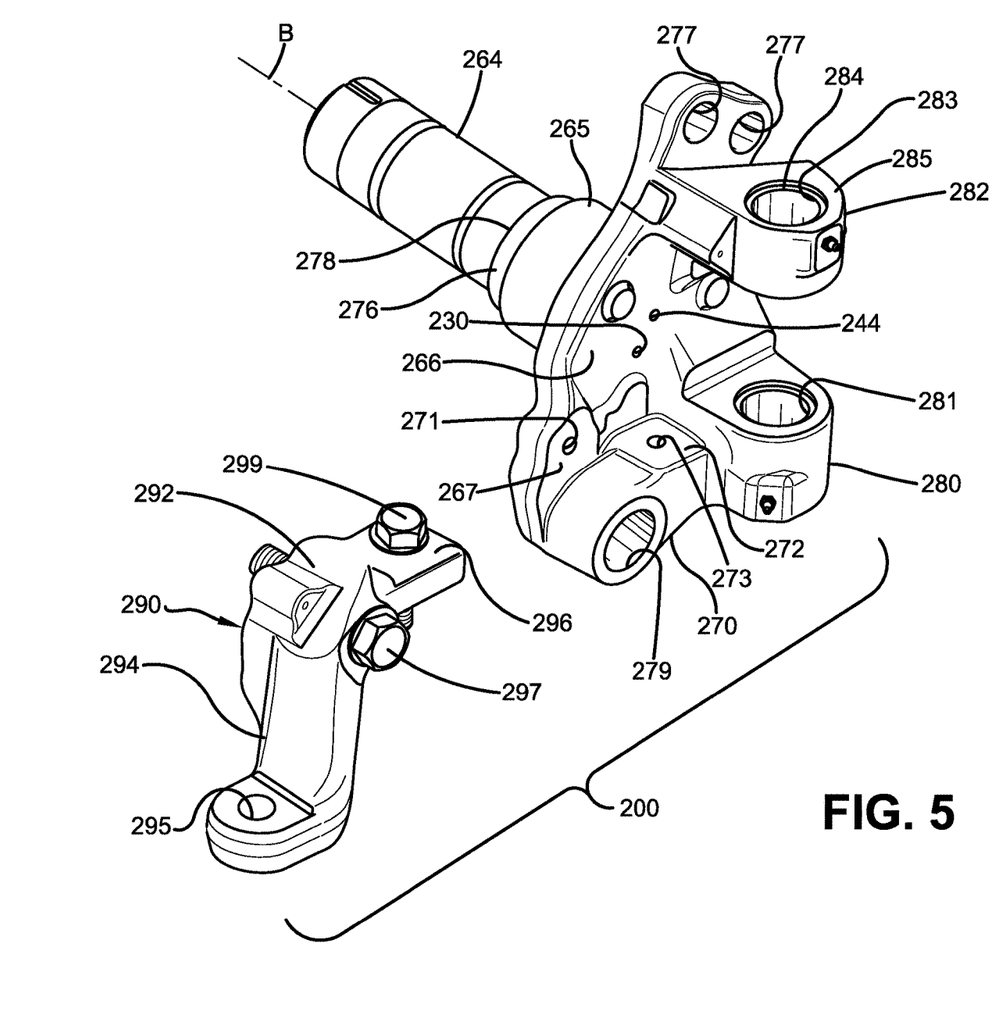
FIG. 5 is an exploded perspective view of the exemplary embodiment knuckle shown in FIG. 2, showing a tie rod arm of the knuckle and associated mounting bolts removed from the knuckle.
Figure 6:
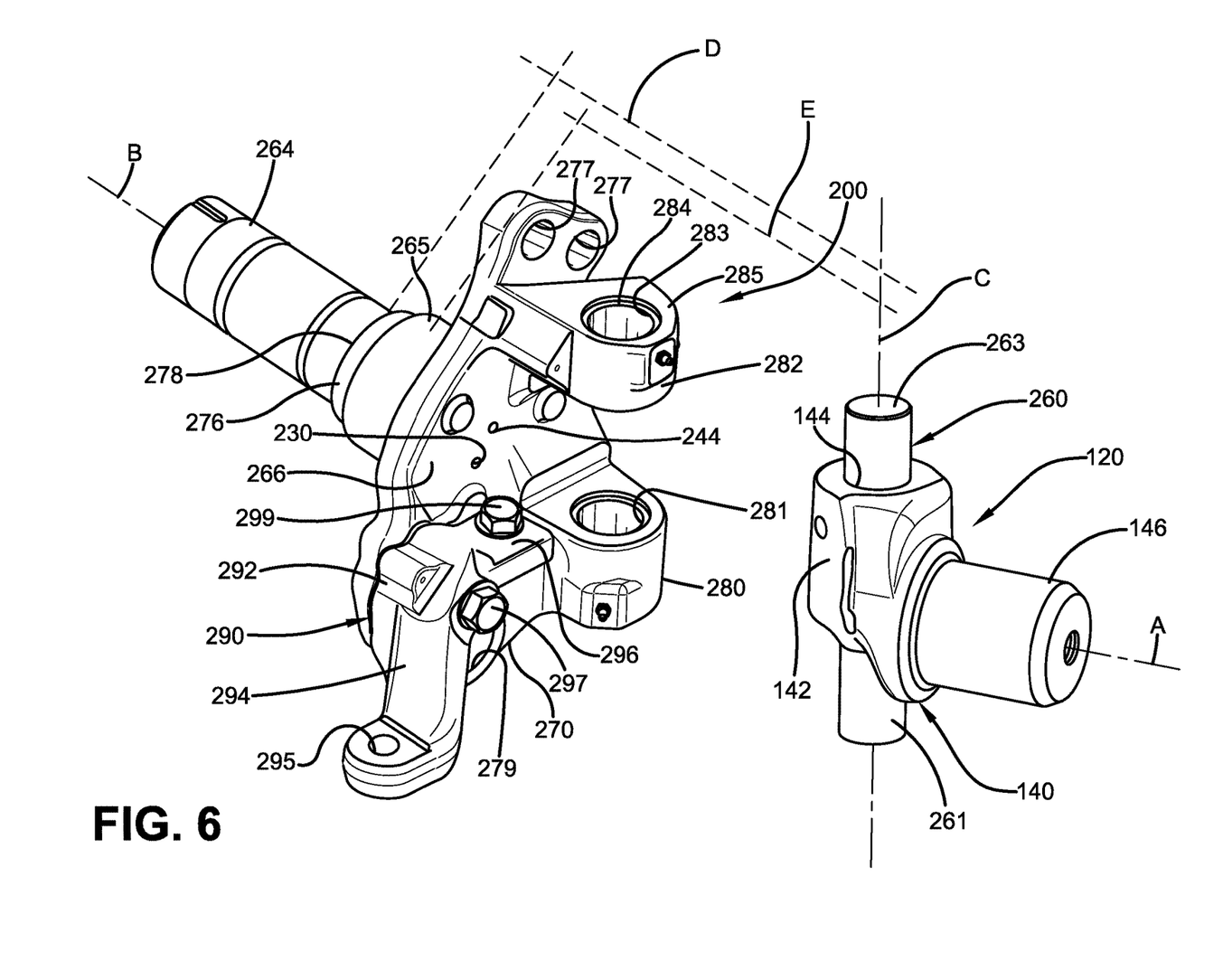
FIG. 6 is a perspective view of the exemplary embodiment knuckle shown in FIG. 2, showing the orientation of an axle end piece of a steerable axle of the self-steering axle/suspension system relative to the knuckle.

With reference to FIGS. 2-6, exemplary embodiment knuckle 200 includes a body or brake spider portion 266 formed of a suitable rigid material, such as steel. Body 266 is preferably formed by forging, but can be formed by other suitable methods depending on the materials used, such as by casting, without affecting the overall concept or operation of the subject disclosure. With reference to FIGS. 3 and 5-6, body 266 is formed with a first arm or lower arm 280. First arm 280 extends inboardly from body 266 adjacent the bottom of the body. With reference to FIGS. 3-6, body 266 is also formed with a second arm or upper arm 282. Second arm 282 extends inboardly from body 266 adjacent the top of the body and is spaced from and in general vertical or coaxial alignment with first arm 280. First arm 280 and second arm 282 are preferably integrally formed as one-piece with body 266, for example, during a forging operation. With reference to FIGS. 3 and 5-6, first arm 280 includes a vertical opening 281 for receiving a first end portion or lower portion 261 of a king pin 260 (FIG. 6). With reference to FIGS. 3-6, second arm 282 includes a vertical opening 283 that is vertically or coaxially aligned with opening 281 of first arm 280 for receiving a second end portion or upper portion 263 of king pin 260 (FIG. 6). With reference to FIG. 3, a bushing 286a is disposed within opening 281 of first arm 280 and a bushing 286b is disposed within opening 283 of second arm 282.

With reference to FIGS. 3-6, body 266 of exemplary embodiment knuckle 200 is also formed with tie rod arm mounting structure 270. With reference to FIG. 5, tie rod arm mounting structure 270 is formed with and extends generally rearward from first arm 280 and is formed with and extends inboardly from body 266 of exemplary embodiment knuckle 200. Mounting structure 270 includes a horizontally planar tie rod arm attachment surface 272. Attachment surface 272 includes a threaded vertical opening 273 that extends vertically into mounting structure 270, the importance of which will be described in detail below. Body 266 of knuckle 200 is formed with a vertically planar tie rod arm attachment surface 267 on its inboard side. Attachment surface 267 includes a threaded axial opening 271 (FIGS. 4-5) that extends outboardly through body 266, the importance of which will also be described in detail below.

With reference to FIG. 6, king pin 260 is utilized to pivotally connect exemplary embodiment knuckle 200 to steerable axle 120 of the self-steering axle/suspension system (not shown). Steerable axle 120 is generally similar in structure and function to steerable axle 20 described above, except that it employs a pair of end pieces 140 that include structure different than that of end pieces 54. Like steerable axle 20, steerable axle 120 includes a central axle tube (not shown) attached to a pair of transversely-spaced trailing arm beams (not shown) of the self-steering axle/suspension system, such as beams 40 of self-steering axle/suspension system 10 described above, by any suitable means, such as welds and/or fasteners. Each end piece 140 is attached to a respective outboard end of the central axle tube of steerable axle 120, which will be described in detail below. Inasmuch as end pieces 140 are similar, for purposes of conciseness and clarity only one end piece will be described in detail.

With continued reference to FIG. 6, end piece 140 of steerable axle 120 is forged of a suitable sturdy material, such as steel, and is then machine finished. End piece 140 includes a main portion 142 formed with a vertical opening 144 extending completely through the main portion for receiving a central portion (not shown) of king pin 260. End piece 140 includes an axle attachment portion or plug portion 146 that extends inboardly from main portion 142 of the end piece, such that an axial central axis A of the end piece extends in a direction perpendicular to a vertical or coaxial central axis C of opening 144. Axle attachment portion 146 of end piece 140 has an outer periphery that is shaped and sized to be press fit within the end portion of the central axle tube of steerable axle 120. In the illustrated example, axle attachment portion 146 has a substantially cylindrical configuration and solid structure, but can have different configurations and/or structures, such as a square configuration and/or a hollow structure, depending on the shape and configuration of the central axle tube of steerable axle 120, without affecting the overall concept or operation of the subject disclosure. The central axle tube may have surface means near an end of the central axle tube for welding end piece 140 to the central axle tube of steerable axle 120 to prevent relative rotation, such as one or more windows (not shown). It is contemplated that, depending on the configuration and/or structure of end piece 140 and/or steerable axle 120, the end piece could be attached to the axle central tube of the steerable axle by means other than an interference fit, such as by friction welding, without affecting the overall concept or operation of the subject disclosure.

Main portion 142 of end piece 140 is disposed in a gap formed between vertically or coaxially spaced-apart first arm 280 and second arm 282 of exemplary embodiment knuckle 200, such that when the main portion of the end piece is positioned between the first arm and the second arm, vertical opening 144 vertically or coaxially aligns with openings 281 and 283 of the first arm and second arm, respectively. King pin 260 is disposed through vertically or coaxially aligned opening 283 of second arm 282 of knuckle 200, opening 144 of end piece 140 of steerable axle 120, and opening 281 of first arm 280 of the knuckle. King pin 260 is immovable relative to main portion 142 of end piece 140 of steerable axle 120 via a tapered draw key (not shown), which engages a respective flat (not shown) that may be machined on the inboard side of the king pin in the central portion of the king pin. The tapered draw key is wedged between the respective flat machined in the inboard side of the king pin and end piece 140 of steerable axle 120 about opening 144, such that the king pin is forced to contact the outboard side of the opening to immovably secure the king pin to the end piece. Alternatively, king pin 260 may be immovable relative to main portion 142 of end piece 140 of steerable axle 120 via more than one tapered draw key. For example, king pin 260 may be immovable relative to main portion 142 of end piece 140 of steerable axle 120 via a pair of tapered draw keys (not shown), which each engage respective flats (not shown) machined on the bottom inboard side of the king pin and the top outboard side of the king pin in the central portion of the king pin. In such a configuration, the tapered draw keys are wedged between the respective flats machined in the top outboard side of king pin 260 and the bottom inboard side of the king pin and end piece 140 of steerable axle 120 about opening 144, such that the king pin is forced to contact the inboard side of the opening near the top of the opening and the outboard side of the opening near the bottom of the opening to immovably secure the king pin to the end piece. Once disposed within vertically or coaxially aligned opening 283 of second arm 282 of knuckle 200, immovably secured within opening 144 of end piece 140 of steerable axle 120, and disposed within opening 281 of first arm 280 of the knuckle, king pin 260 extends substantially along vertical central axis C (FIG. 6), and thus is substantially perpendicular to axial central axis A of end piece 140 (FIG. 6), and thus steerable axle 120. In this manner, exemplary embodiment knuckle 200 is pivotally mounted about king pin 260 in frontward and rearward directions.

A cap (not shown) is disposed within a counterbore 284 (FIGS. 3-6) formed in second arm 282 of exemplary embodiment knuckle 200 adjacent opening 283 and seals the upper end of the opening to prevent contaminants from the environment in which the heavy-duty vehicle operates from entering the pivotal connection of the knuckle to end piece 140 of steerable axle 120 via the king pin 260. An upper or outermost surface (not shown) of the cap may be substantially flush with an upper surface 285 (FIGS. 3-6) of second arm 282 or can be spaced slightly upward or downward from the end of opening 283. Exemplary embodiment knuckle 200 and end piece 140 of steerable axle 120 are preferably manufactured in a complementary manner to support king pin 260 in a substantially vertical orientation, but can be manufactured such that they have a relatively small total negative camber in a range from about 0.5 degrees (0.5°) to about 5.0 degrees (5.0°) without affecting the overall concept or operation of the subject disclosure.

With reference to FIGS. 2-6, exemplary embodiment knuckle 200 includes a spindle 264 that is fixed to body 266 of the knuckle by any suitable means, such as welding. More specifically, body 266 includes a protrusion 268 with an outboard end portion 269 (FIG. 4) that is sized to have inner and outer diameters substantially the same as the respective inner and outer diameters of an inboard end portion 265 (FIGS. 2 and 4-6) of spindle 264. Spindle 264 preferably is friction welded to body 266 of knuckle 200 at an interface between inboard end portion 265 of the spindle and outboard end portion 269 of protrusion 268 of the body. Protrusion 268 allows a weld site (not shown) of the friction welding process to have good shape and relatively even weld curls (not shown) on the protrusion and on spindle 264. The weld curls at the weld site that are located on the outer periphery of inboard end portion 265 of spindle 264 and protrusion 268 may be machined away. The weld curls at the weld site on the inner periphery do not interfere with the operation or impact the strength and longevity of spindle 264, and thus knuckle 200, and may be left in place. Spindle 264 is forged of a suitable material, such as steel, and is then machine finished to have precise dimensions, such as for mounting components of a wheel end assembly, prior to being friction welded to protrusion 268 of body 266 of knuckle 200.

Spindle 264 is oriented relative to king pin 260 such that exemplary embodiment knuckle 200 provides the self-steering axle/suspension with a king pin leading arrangement. That is, vertical central axis C (FIG. 6), through which king pin 260 extends, is located frontward of an axial central axis B (FIGS. 2-6) of spindle 264, which assists in self-steering and minimizes vibration or oscillation of the self-steering axle/suspension system. Vertical central axis C, through which king pin 260 extends, is preferably positioned frontward of axial central axis B within the range of 1.5 inches to 5 inches, but could be positioned frontward of the axial central axis at other distances without affecting the overall concept or operation of the subject disclosure.

Spindle 264 enables mounting of a wheel end assembly (not shown) of the self-steering axle/suspension system. More specifically, the wheel end assembly includes a bearing assembly (not shown) with an inboard bearing (not shown) and an outboard bearing (not shown) that are mounted on the outboard end of spindle 264. With reference to FIGS. 2 and 4-6, the inboard bearing abuts an outboard end 278 of a bearing shoulder 276 formed on spindle 264. The outboard bearing is spaced outboardly from the inboard bearing on spindle 264. A spindle nut assembly (not shown) is threaded onto the outboard end of spindle 264 and secures the inboard and outboard bearings in place. A wheel hub (not shown) of the wheel end assembly is mounted on the inboard and outboard bearings for rotation relative to spindle 264. A hub cap (not shown) is mounted on the outboard end of the wheel hub and closes the outboard end of the wheel hub, and thus the wheel end assembly. A plurality of threaded fasteners or studs (not shown) and mating nuts (not shown) are used to mount a single rim (not shown) or a pair of rims (not shown), depending on specific design considerations of the wheel end assembly, to the wheel hub. A tire (not shown) is mounted on each rim. It is to be understood that spindle 264 could have other shapes and configurations than that shown and described without affecting the overall concept or operation of the subject disclosure.

With reference to FIG. 6, axial central axis B (FIGS. 4-6) of spindle 264 is substantially axially aligned with axial central axis A of steerable axle 120 when the self-steering axle/suspension system has the vehicle tires in a straight-ahead position or loaded non-turning condition. The spindle 264 may pivot about king pin 260 in either direction relative to axial central axis A of steerable axle 120 of up to about 30° from the straight-ahead position of the vehicle wheels.

With reference to FIGS. 2-6, exemplary embodiment knuckle 200 includes a discrete tie rod arm 290 for attaching a tie rod (not shown) of the self-steering axle/suspension system, such as tie rod 66 of self-steering axle/suspension system 10 described above. Tie rod arm 290 includes a body portion 292 (FIGS. 3-6). Body portion 292 is formed with an axially extending opening (not shown) formed through the body, the importance of which will be described below. With reference to FIGS. 3 and 5-6, tie rod arm 290 further includes a mounting arm 296 that is integrally formed with and extends frontward from body portion 292. Mounting arm 296 is formed with a vertical opening (not shown), the importance of which will also be described below. With reference to FIGS. 2-6, tie rod arm 290 further includes a rearwardly extending tie rod attachment portion 294. A vertical opening 295 is formed in tie rod attachment portion 294 adjacent the rearward end of the tie rod attachment portion.

With reference to FIGS. 3-6, tie rod arm 290 is positioned relative to body 266 of exemplary embodiment knuckle 200 such that the outboard surface of body portion 292 of the tie rod arm contacts and is flush with tie rod arm attachment surface 267 (FIG. 5) of the body, and the bottom surface of mounting arm 296 (FIGS. 3 and 5-6) of the tie rod arm contacts and is flush with tie rod arm attachment surface 272 (FIG. 5) of tie rod arm mounting structure 270 (FIGS. 3-6) of the body. When tie rod arm 290 is positioned relative to body 266 in this manner, the axially extending opening formed in body portion 292 of the tie rod arm is axially aligned with threaded axial opening 271 (FIGS. 4-5) formed in attachment surface 267 (FIG. 5) of the body of knuckle 200, and the vertical opening formed in mounting arm 296 (FIGS. 3 and 5-6) of the tie rod arm is vertically aligned with threaded vertical opening 273 (FIG. 5) formed in attachment surface 272 (FIG. 5) of mounting structure 270 of the knuckle.

With reference to FIGS. 3-6, a first or axial bolt 297 is disposed through the axially extending opening formed in body portion 292 of tie rod arm 290 (FIGS. 2-6) and threadably engages aligned axial opening 271 (FIGS. 4-5) formed in tie rod arm attachment surface 267 (FIG. 5) of body 266 of knuckle 200. With reference to FIGS. 3 and 5-6, a second or radial bolt 299 is disposed through the vertical opening formed in mounting arm 296 of tie rod arm 290 and threadably engages aligned vertical opening 273 formed in tie rod arm attachment surface 272 (FIG. 5) of mounting structure 270 (FIGS. 3-6) of knuckle 200. In this manner, tie rod arm 290 is removably secured to body 266 of exemplary embodiment knuckle 200. Tie rod arm 290 supports pivotal attachment of the tie rod (not shown), such that an axial central axis (not shown) of the tie rod is positioned parallel to axial central axis A of steerable axle 120 (FIG. 6) when the vehicle wheels are in the straight-ahead position.

Exemplary embodiment knuckle 200 also includes structure to accommodate components of a tire inflation system, as well as vent an interior of the wheel end assembly mounted on spindle 264, for example, during a pressure build-up within the wheel end assembly from a leak of a tire inflation system component. More specifically, and with reference to FIGS. 3 and 5-6, body 266 of knuckle 200 is formed with a first axial opening 230 extending through the body at a location positioned radially inwardly of protrusion 268 (FIG. 4), such that when spindle 264 is attached to the protrusion, the first axial opening is in fluid communication with an interior 274 (FIGS. 2 and 4) of the spindle. First axial opening 230 is sized such that it enables a pneumatic line of a tire inflation system (not shown) of a type known in the art to be disposed through the opening and extend from the exterior of knuckle 200 into interior 274 (FIGS. 2 and 4) of spindle 264, and ultimately to other components (not shown) of the tire inflation system incorporated into the wheel end assembly, such as a wheel valve and rotary union, to support inflation of the tire(s) of the wheel(s) rotatably mounted on the spindle via the wheel hub.

With reference to FIG. 3, exemplary embodiment knuckle 200 includes a vent system 240 incorporated into the knuckle. With reference to FIGS. 4-6, vent system 240 includes an axial opening 244 that extends through body 266 of knuckle 200 at a location positioned radially inwardly of protrusion 268 (FIG. 4), such that when spindle 264 is attached to the protrusion, the axial opening is in fluid communication with interior 274 (FIGS. 2 and 4) of the spindle. With reference to FIG. 3, a pneumatic check valve 246 of vent system 240 is attached to axial opening 244 on the inboard surface of body 266 of knuckle 200. A vent tube 248 in turn is connected to check valve 246 via a hose clamp 249.

Upon a pressure build-up within the wheel end assembly mounted on spindle 264 of exemplary embodiment knuckle 200, such as from a leak of a tire inflation system component, vent system 240 of the knuckle enables pressurized air to be vented from the interior of the wheel end assembly to atmosphere. More specifically, pressurized air from within the wheel end assembly is able to flow from the interior of the wheel end assembly, through interior 274 (FIGS. 2 and 4) of spindle 264, axial opening 244, check valve 246, vent tube 248, and to atmosphere. It is contemplated that exemplary embodiment knuckle 200 could employ vent system 240 in self-steering axle/suspension system configurations that do not utilize tire inflation systems. In such configurations, as a pneumatic line does not pass through first axial opening 230 formed in body 266 of knuckle 200, the first axial opening may be plugged via suitable means. In this manner, vent system 240 of knuckle 200 prevents pressure build-ups within components of the wheel end assembly mounted on spindle 264 and reduces the potential for damage to the components, such as associated seals (not shown) and bearings (not shown), from such pressure build-ups.

In accordance with an important aspect of the subject disclosure, exemplary embodiment knuckle 200 includes structure integrated into the knuckle for mounting components of a drum brake assembly 302 of a drum brake system 300. More specifically, and with reference to FIGS. 2-6, body or brake spider portion 266 of knuckle 200 is formed with a pair of brake shoe mounting openings 277 adjacent a top end of the body. Brake shoe openings 277 enable pivotal mounting of an upper brake shoe 304B and a lower brake shoe 304A (FIGS. 2-3). More specifically, and with reference to FIGS. 2-3, an anchor pin 308 is disposed within and extends through each one of openings 277. Each anchor pin 308 may be slip fit within a respective bushing (not shown) disposed within a respective brake shoe opening 277. Brake shoes 304A and 304B each include a respective pair of side walls 305A and 305B that are rotatably connected to respective ones of anchor pins 308 in a manner known in the art. Each brake shoe 304A and 304B includes a brake shoe table 306A and 306B, respectively, that is rigidly attached to respective side walls 305A and 305B by suitable means, such as welds. Each brake shoe 304A and 304B also includes a respective pair of brake pads 307A and 307B that are attached to a respective one of brake shoe table 306A and 306B via a respective plurality of fasteners 309A and 309B, such as rivets. It is to be understood that body or brake spider portion 266 of knuckle 200 could be formed with only a single brake shoe mounting opening 277 adjacent the top end of the body with an anchor pin 308 disposed therein to support a single anchor pin drum brake system configuration without affecting the overall concept or operation of the subject disclosure. In such a configuration, anchor pin 308 may be interference fit within the single brake shoe mounting opening 277 or slip fit within a bushing (not shown) disposed within the single brake shoe mounting opening.

With reference to FIG. 2, first resilient retaining members (not shown), preferably coiled tension springs, referred to in the art as retaining springs, are connected to and extend between respective first openings 310A (only one shown) formed in side walls 305A and first openings 310B (only one shown) formed in side walls 305B of brake shoes 304A and 304B, respectively, near the pivotal connection of the side walls to anchor pins 308. Second resilient retaining members (not shown), preferably also coiled tension springs, referred to in the art as return springs, are connected to and extend between respective second openings 311A formed in side walls 305A and second openings (not shown) formed in side walls 305B of brake shoes 304A and 304B, respectively. The second resilient retaining members retain the ends of side walls 305A and 305B of brake shoes 304A and 304B, respectively, opposite their pivotal connections to anchor pins 308 to a respective roller 312A and 312B.

Exemplary embodiment knuckle 200 also includes structure that enables mounting of a cam bracket assembly 320 of drum brake assembly 302. More specifically, and with reference to FIGS. 2, and 4-6, body 266 of knuckle 200 is formed with a cam tube opening 279 adjacent a bottom end of the body. Cam tube opening 279 extends axially through body 266, including through tie rod arm mounting structure 270 of the body. Cam tube opening 279 is sized to accommodate a cam tube 322 of cam bracket assembly 320 (FIGS. 2-3), which is disposed within the opening. Cam tube 322 is rigidly attached to body 266 within cam tube opening 279 by any suitable means, such as welds. Cam bracket assembly 320 includes a cam shaft (not shown), which is disposed through and rotatably mounted within cam tube 322. More specifically, the cam shaft passes through outboard and inboard bushings (not shown) that are friction fit within the outboard and inboard ends of cam tube 322, respectively, and extends outboardly and inboardly of the outboard and inboard ends of the cam tube, respectively. The outboard and inboard bushings within cam tube 322 enable rotation of the cam shaft within the cam tube. The cam shaft includes a splined inboard end (not shown) that extends inboardly from the inboard end of cam tube 322. The splined inboard end of the cam shaft meshingly engages a corresponding splined interior surface (not shown) of a slack adjuster (not shown) of drum brake assembly 302. Cam bracket assembly 320 further includes an S-cam (not shown) that is attached to the outboard end of the cam shaft, such that the S-cam is exposed and is located outboard of and adjacent to the outboard end of cam tube 322 and operatively engages rollers 312A and 312B (FIG. 2) in a manner known in the art.

With reference to FIGS. 2-3, a brake air chamber mounting bracket 326 is rigidly attached to the inboard end of cam tube 322 by any suitable means, such as welds. Brake air chamber mounting bracket 326 is formed with a pair of openings 327 (FIG. 3) that enable mounting of a brake air chamber (not shown) of a type known in the art that is operatively connected to an air source located on the heavy-duty vehicle via a pneumatic line. A push rod (not shown) slidably and operatively connected to the brake air chamber extends rearward from the brake air chamber and through a notch 328 formed in the bracket. The rearward end of the push rod is pivotally attached to the slack adjuster in a known manner.

During braking of the heavy-duty vehicle, in response to a brake command, the pressurization of the brake air chamber forces the push rod rearward and causes rotation of the slack adjuster at the splined connection of the slack adjuster to the cam shaft, which in turn causes the cam shaft to rotate within cam tube 322 of cam bracket assembly 320. This in turn causes the S-cam to engage rollers 312A and 312B. Rollers 312A and 312B in turn contact respective side walls 305A and 305B of brake shoes 304A and 304B. The S-cam causes each roller 312A and 312B to move in a generally radially outward direction, reacting against each respective anchor pin 308 and overcoming the force of the first resilient retaining members and second resilient retaining members connected to respective side walls 305A and 305B of brake shoes 304A and 304B. When the force of the first resilient retaining members and second resilient retaining members are overcome, brake shoes 304A and 304B pivot about anchor pins 308, such that the brake shoes move radially outwardly. As brake shoes 304A and 304B move radially outwardly, their respective brake pads 307A and 307B contact an inner surface of a brake drum attached to the wheel hub of the wheel end assembly rotatably mounted on spindle 264 of exemplary embodiment knuckle 200 to slow or stop the heavy-duty vehicle. When the braking operation is complete, the first resilient retaining members and second resilient retaining members move each brake shoe 304A and 304B generally radially inward to a non-applied position, as known in the art.

Because body 266 of exemplary embodiment knuckle 200 enables components of drum brake assembly 302 of drum brake system 300 to be directly mounted on the knuckle, including brake shoes 304A and 304B and cam tube 322, the knuckle eliminates the need for a discrete brake spider to be rigidly attached to a spindle end, such as brake spider 80 attached to spindle end 68 of prior art knuckle 58, to support mounting of such drum brake assembly components. This in turn eliminates the relatively complex manufacturing process and additional components required for preparing a spindle end for mounting and attaching a discrete brake spider, such as that required to mount and attach discrete brake spider 80 to spindle end 68 of prior art knuckle 58, thereby reducing the overall manufacturing complexity and cost of exemplary embodiment knuckle 200 as compared to prior art knuckles.

In addition, because structure for mounting components of drum brake assembly 302 of drum brake system 300, including brake shoe mounting openings 277 and cam tube opening 279, is integrated into body 266 of knuckle 200, and the need to mount a discrete brake spider on a spindle of the knuckle to mount components of the drum brake assembly is eliminated, the overall length of spindle 264 can be reduced compared to spindle ends of prior art knuckles that require mounting of a discrete brake spider, such as spindle end 68 of prior art knuckle 58 to which brake spider 80 is mounted and attached. Consequently, exemplary embodiment knuckle 200 enables a distance D (FIG. 6) between outboard end 278 of bearing shoulder 276 and vertical central axis C, along which king pin 260 extends, to be reduced compared to the prior art. Distance D is preferably within the range of about 7.5 inches to about 10.5 inches, and more preferably within the range of about 8.5 inches to about 9.5 inches. This in turn enables the wheel hub rotatably mounted on the inboard and outboard bearings mounted on spindle 264 to be in closer inboard proximity to the pivotal connection of knuckle 200 to end piece 140 of steerable axle 120 via king pin 260, which shortens the distance between a vertical centerline (not shown) of the wheel connected to the wheel hub and vertical central axis C (FIG. 6), along which king pin 260 extends, compared to the prior art. Moreover, exemplary embodiment knuckle 200 enables a distance E (FIG. 6) between a vertical centerline of brake shoe mounting openings 277, and thus a vertical centerline of brake shoes 304A and 304B, and vertical central axis C, along which king pin 260 extends, to be reduced compared to prior art knuckles, such as prior art knuckle 58. Distance E is preferably within the range of about 4.0 inches to about 7.0 inches, and more preferably within the range of about 4.5 inches to about 6.0 inches. This overall less cantilevered design reduces stress and fatigue of knuckle 200 and the pivotal connection of the knuckle to end piece 140 of steerable axle 120, and thus reduces the potential for premature failure of the knuckle and/or knuckle to end piece connection.

In accordance with another important aspect of the subject disclosure, because tie rod arm 290 is connected to body 266 of exemplary embodiment knuckle 200 via first bolt 297 and second bolt 299, the tie rod arm is removable from the knuckle, and thus the self-steering axle/suspension system. This enables exemplary embodiment knuckle 200 to provide sufficient flexibility and robustness during assembly of a self-steering axle/suspension employing the exemplary embodiment knuckle(s) so that the knuckle(s) can be incorporated into and utilized with self-steering axle/suspension systems with varying components and configurations different than those shown and described, such as fabricated top mount self-steering axle/suspension systems.

Moreover, the configuration and manner in which tie rod arm 290 is connected to body 266 of exemplary embodiment knuckle 200 minimizes the overall required size of the knuckle, while providing a sturdy structure that resists overload conditions, which reduces the overall weight of the heavy-duty vehicle, provides desired turn angle of the knuckle and mounted wheel, and provides desired strength to the knuckle. More specifically, and with particular reference to FIGS. 5-6, second bolt 299 is disposed through the vertical opening formed in mounting arm 296 of tie rod arm 290 and threadably engages threaded vertical opening 273 formed in tie rod arm attachment surface 272 of mounting structure 270, and first bolt 297 is disposed through the axially extending opening formed in body portion 292 of tie rod arm 290 and threadedly engages axial opening 271 formed in tie rod arm attachment surface 267 of body 266, such that the first and second bolts are positioned about ninety degrees (90°) from one another in offset axial and vertical planes, respectively. In addition, first bolt 297, which is the attachment point of tie rod arm 290 to body 266 closest in proximity to the connection of the tie rod to tie rod attachment portion 294 of the tie rod arm, provides an axial connection of the tie rod arm to the body of the knuckle. This attachment configuration of tie rod arm 290 to body 266 provides a generally sturdy and robust connection with sufficient clamping force capable of resisting overload conditions, without failure of the tie rod arm or loosening of the connection of the tie rod to the tie rod arm and/or the connection of the tie rod arm to the body of knuckle 200.

Moreover, because second bolt 299 is disposed through the vertical opening formed in mounting arm 296 of tie rod arm 290 and threadably engages threaded vertical opening 273 formed in tie rod arm attachment surface 272 of mounting structure 270, sufficient clearance exists to enable exemplary embodiment knuckle 200 to provide up to a thirty-degree (30°) wheel cut for the wheel associated with the knuckle, as well as accommodate mounting and provide clearance for cam tube 322 of cam bracket assembly 320 disposed within cam tube opening 279 formed in body 266 of knuckle 200.

Thus, exemplary embodiment knuckle for a self-steering axle/suspension system 200 of the subject disclosure includes an integrally formed structure for mounting components of a drum brake system, which eliminates complex manufacturing processes for preparing a spindle end of the knuckle capable of mounting a discrete brake spider and machining of multiple interfaces on the spindle end to position and attach the discrete brake spider, thereby reducing manufacturing complexity and cost. Exemplary embodiment knuckle 200 includes a spindle that is forged, machine finished, and then friction welded directly to the knuckle with only a single friction weld, which eliminates the need to utilize multiple welds to attach the spindle to the knuckle and the brake spider to the spindle, thereby reducing manufacturing costs and increasing the overall strength of the spindle. Also, by integrating structure for mounting drum brake system components into exemplary embodiment knuckle 200, the distance from the brake spider to the king pin, and consequently the bearing shoulder of the spindle to the king pin, and thus the distance from the king pin to a vertical centerline of a wheel mounted on the spindle, is minimized, which reduces stress on the knuckle and the pivotal connection of the knuckle to an end piece of a steerable axle, thereby increasing the overall strength and reducing fatigue of the knuckle and pivotal connection of the knuckle to the steerable axle, and reducing the risk for potential premature failure of the knuckle and/or pivotal connection of the knuckle to the steerable axle. In addition, exemplary embodiment knuckle 200 includes a discrete tie rod arm bolted to the knuckle via axial and radial bolting in a manner that minimizes the overall size and weight of the knuckle, while providing a sturdy structure that resists overload conditions, which reduces the overall weight of the heavy-duty vehicle, provides desired turn angle of the knuckle and mounted wheel, and provides the knuckle with a robust structure capable of being utilized on self-steering axle/suspension systems with varying components and configurations.

It is to be understood that the knuckle for a heavy-duty vehicle self-steering axle/suspension system of the subject disclosure finds application in all types of self-steering axle/suspension systems known to those skilled in the art, including those with other components and configurations than those shown and described herein, without affecting the concept or operation of the subject disclosure. It is also to be understood that the knuckle for a heavy-duty vehicle self-steering axle/suspension system of the subject disclosure can include other shapes and configurations than that shown and described without affecting the overall concept or operation of the subject disclosure. It is to be further understood that the knuckle for a heavy-duty vehicle self-steering axle/suspension system of the subject disclosure can be utilized in conjunction with drum brake systems with components and configurations different than those shown and described without affecting the overall concept or operation of the subject disclosure, such as those including single anchor pin configurations.

Accordingly, the knuckle for a heavy-duty vehicle self-steering axle/suspension system of the subject disclosure is simplified, provides an effective, safe, inexpensive, and efficient structure which achieves all the enumerated objectives, provides for eliminating difficulties encountered with prior art knuckles for heavy-duty vehicle self-steering axle/suspension systems, and solves problems and obtains new results in the art.

In the foregoing description, certain terms have been used for brevity, clarity and understanding; but no unnecessary limitations are to be implied therefrom beyond the requirements of the prior art, because such terms are used for descriptive purposes and are intended to be broadly construed. Moreover, the subject disclosure has been described with reference to a specific embodiment. It shall be understood that this illustration is by way of example and not by way of limitation, as the scope of the invention is not limited to the exact details shown or described. Potential modifications and alterations will occur to others upon a reading and understanding of the subject disclosure, and it is understood that the subject disclosure includes all such modifications and alterations and equivalents thereof.

Having now described the features, discoveries and principles of the subject disclosure, the manner in which the knuckle for a heavy-duty vehicle self-steering axle/suspension system is constructed, arranged and used, the characteristics of the construction and arrangement, and the advantageous, new and useful results obtained; the new and useful structures, devices, elements, arrangements, parts and combinations are set forth in the appended claims.

What is claimed is:

1. A knuckle for a self-steering axle/suspension system for a heavy-duty vehicle having a drum brake system, said knuckle comprising:
   a body, said body being adapted for receiving a king pin of said self-steering axle/suspension system for pivotal connection of said knuckle to an axle of said self-steering axle/suspension system;
   a spindle extending from an outboard surface of said body;
   a first arm extending from an inboard surface of said body, said first arm having an opening for receiving a first end portion of said king pin;
   a second arm extending from said inboard surface of said body, said second arm having an opening coaxially aligned with said opening of said first arm for receiving an opposite second end portion of said king pin; and
   drum brake system component mounting structure, said drum brake system component mounting structure including:
     at least one brake shoe mounting opening; and
     a cam tube opening, said drum brake system component mounting structure mounting one or more components of said drum brake system, wherein said body, said first arm, said second arm, and said drum brake system component mounting structure are integrally formed, a distance between an outboard end of a bearing shoulder of said spindle and a vertical axis extending through said first arm opening and said second arm opening is within about 7.5 inches to about 10.5 inches, and a distance between a vertical centerline of said at least one brake shoe mounting opening and said vertical axis is within about 4.0 inches to about 7.0 inches.

2. The knuckle for a self-steering axle/suspension system for a heavy-duty vehicle of claim 1, wherein said spindle is fixed to said body via a single weld.

3. The knuckle for a self-steering axle/suspension system for a heavy-duty vehicle of claim 2, wherein said single weld is a friction weld.

4. The knuckle for a self-steering axle/suspension system for a heavy-duty vehicle of claim 1, wherein said distance between said outboard end of said bearing shoulder of said spindle and said vertical axis extending through said first arm opening and said second arm opening is within about 8.5 inches to about 9.5 inches.

5. The knuckle for a self-steering axle/suspension system for a heavy-duty vehicle of claim 1, further comprising a discrete tie rod arm, said tie rod arm being removably connected to said body of said knuckle without welds.

6. The knuckle for a self-steering axle/suspension system for a heavy-duty vehicle of claim 5, said tie rod arm being connected to said body via a first fastener and a second fastener, said first fastener being positioned offset axially and vertically from said second fastener.

7. The knuckle for a self-steering axle/suspension system for a heavy-duty vehicle of claim 6, wherein said first fastener is positioned about 90 degrees offset axially from said second fastener.

8. The knuckle for a self-steering axle/suspension system for a heavy-duty vehicle of claim 7, wherein said first fastener and said second fastener are bolts.

9. The knuckle for a self-steering axle/suspension system for a heavy-duty vehicle of claim 1, wherein said at least one brake shoe mounting opening is adapted for mounting an anchor pin for pivotal connection of a brake shoe.

10. The knuckle for a self-steering axle/suspension system for a heavy-duty vehicle of claim 1, wherein said drum brake component mounting structure includes a pair of brake shoe mounting openings adapted for mounting a pair of anchor pins for pivotal connection of a pair of brake shoes.

11. The knuckle for a self-steering axle/suspension system for a heavy-duty vehicle of claim 1, wherein said cam tube opening is adapted for mounting a cam tube of a cam bracket assembly.

12. The knuckle for a self-steering axle/suspension system for a heavy-duty vehicle of claim 1, said body further including a protrusion extending outboardly from the body, said spindle being fixed to an outboard end of said protrusion via friction welding.

13. The knuckle for a self-steering axle/suspension system for a heavy-duty vehicle of claim 1, said knuckle further comprising structure for accommodating one or more components of a tire inflation system, said structure including a first axial opening, said first axial opening extending through said body at a location positioned radially inward of said spindle, the first axial opening being sized to enable passage of a pneumatic line of a tire inflation system through said first axial opening and into an interior of the spindle.

14. The knuckle for a self-steering axle/suspension system for a heavy-duty vehicle of claim 13, further comprising a vent system incorporated into said knuckle, said vent system including:
   a second axial opening extending through said body at a location positioned radially inward of said spindle; and
   a pneumatic check valve, said pneumatic check valve being attached to said second axial opening adjacent an inboard surface of the body, said pneumatic check valve enabling pressurized air to be vented from said interior of the spindle to atmosphere.

15. The knuckle for a self-steering axle/suspension system for a heavy-duty vehicle of claim 1, further comprising a vent system incorporated into said knuckle, said vent system including:
   an axial opening extending through said body at a location positioned radially inward of said spindle; and
   a pneumatic check valve, said pneumatic check valve being attached to said axial opening adjacent an inboard surface of the body, said pneumatic check valve enabling pressurized air to be vented from an interior of the spindle to atmosphere.

16. The knuckle for a self-steering axle/suspension system for a heavy-duty vehicle of claim 1, wherein said drum brake system component mounting structure, said body, said first arm, and said second arm are integrally formed via forging.

17. The knuckle for a self-steering axle/suspension system for a heavy-duty vehicle of claim 1, wherein said knuckle provides up to a thirty-degree wheel cut for a wheel mounted on said spindle.

18. The knuckle for a self-steering axle/suspension system for a heavy-duty vehicle of claim 1, wherein said self-steering axle suspension/system is a trailing arm self-steering axle/suspension system and said vertical axis extending through said first arm opening and said second arm opening is located frontward of an axial central axis of said spindle.

19. A knuckle for a self-steering axle/suspension system for a heavy-duty vehicle having a drum brake system, said knuckle comprising:
- a body, said body being adapted for receiving a king pin of said self-steering axle/suspension system for pivotal connection of said knuckle to an axle of said self-steering axle/suspension system;
- a spindle extending from an outboard surface of said body;
- a first arm extending from an inboard surface of said body, said first arm having an opening for receiving a first end portion of said king pin;
- a second arm extending from said inboard surface of said body, said second arm having an opening coaxially aligned with said opening of said first arm for receiving an opposite second end portion of said king pin;
- a discrete tie rod arm, said tie rod arm being removably connected to said body of said knuckle without welds via a first fastener and a second fastener, said first fastener being positioned offset axially and vertically from said second fastener; and
- drum brake system component mounting structure, said drum brake system component mounting structure including:
  - at least one brake shoe mounting opening; and
  - a cam tube opening, said drum brake system component mounting structure mounting one or more components of said drum brake system, wherein said body, said first arm, said second arm, and said drum brake system component mounting structure are integrally formed.

20. The knuckle for a self-steering axle/suspension system for a heavy-duty vehicle of claim 19, wherein said first fastener is positioned about 90 degrees offset axially from said second fastener.

21. The knuckle for a self-steering axle/suspension system for a heavy-duty vehicle of claim 20, wherein said first fastener and said second fastener are bolts.

* * * * *